(12) United States Patent
Britton

(10) Patent No.: US 7,328,724 B2
(45) Date of Patent: Feb. 12, 2008

(54) CORROSION-INHIBITING LINER FOR A PIPE SUPPORT

(75) Inventor: Jim Britton, Houston, TX (US)

(73) Assignee: Deepwater Corrosion Services, Inc., Houston, TX (US)

( * ) Notice: Subject to any disclaimer, the term of this patent is extended or adjusted under 35 U.S.C. 154(b) by 53 days.

(21) Appl. No.: 11/235,521

(22) Filed: Sep. 25, 2005

(65) Prior Publication Data

US 2007/0068588 A1   Mar. 29, 2007

(51) Int. Cl.
*F16L 3/00* (2006.01)
(52) U.S. Cl. .............. 138/106; 138/113; 248/603; 248/74.5
(58) Field of Classification Search .......... 138/106, 138/107, 113; 248/687, 603, 634, 62, 74.5, 248/74.2
See application file for complete search history.

(56) References Cited

U.S. PATENT DOCUMENTS

| | | | |
|---|---|---|---|
| 2,215,283 A * | 9/1940 | Adler | 174/40 CC |
| 2,903,017 A * | 9/1959 | Cotman, Jr. | 138/113 |
| 3,564,676 A | 2/1971 | Oeser | |
| 3,606,218 A | 9/1971 | Enlund et al. | |
| 4,233,816 A * | 11/1980 | Hensley | 62/50.7 |
| 4,529,009 A * | 7/1985 | Horner et al. | 138/111 |
| 4,722,367 A * | 2/1988 | Swink et al. | 138/178 |
| 4,744,535 A | 5/1988 | Patenaude | |
| 5,544,849 A | 8/1996 | Peterson et al. | |
| 6,126,119 A | 10/2000 | Giangrasso | |
| 6,193,195 B1 | 2/2001 | Owens | |
| 6,241,199 B1 | 6/2001 | Ismert | |
| 6,601,802 B1 * | 8/2003 | Howe | 248/58 |

FOREIGN PATENT DOCUMENTS

DE            42 13 893 A1       4/1993

* cited by examiner

*Primary Examiner*—James Hook
(74) *Attorney, Agent, or Firm*—Jennifer S. Sickler; Gardere Wynne Sewell LLP

(57) ABSTRACT

A corrosion inhibiting liner for a pipe support includes a flexible mat containing spaced-apart slots; and a cylindrically-curved buffer in tight engagement with the mat in each slot, wherein the cylindrically-curved buffer is made of a non-metallic, non-elastomer material that can withstand compressive strength of at least 8,000 psi, and has a friction coefficient less than 0.35. The slots are dove-tail slots, and the greatest thickness of the mat combined with a buffer is less than three-fourths of an inch. The length of each buffer is substantially the same, and is within the range of 1.5 inch to 24 inches.

22 Claims, 6 Drawing Sheets

CORROSION-INHIBITING LINER FOR A PIPE SUPPORT

CROSS-REFERENCES TO RELATED APPLICATIONS

None.

STATEMENT REGARDING FEDERALLY SPONSORED APPLICATIONS

None.

REFERENCE TO A "SEQUENTIAL LISTING"

None.

BACKGROUND OF THE INVENTION

1. Field of the Invention

This invention relates to devices for preventing and slowing down corrosion of pipes caused by their supporting structures.

2. Description of the Related Art

People have attempted to solve the problem of metal pipe corrosion caused by metallic pipe supports by placing rubber or some other elastomer between the pipe and the pipe support. However, the elastomers have still retained enough moisture to aid corrosion. What the industry needs is a pipe support that will not aid corrosion of a metal pipe.

BRIEF SUMMARY OF THE INVENTION

A corrosion inhibiting liner for a pipe support includes a flexible mat containing spaced-apart slots; and a cylindrically-curved buffer in tight engagement with the mat in each slot, wherein the cylindrically-curved buffer is made of a non-metallic, non-elastomer material that can withstand compressive strength of at least 8000 psi, and has a friction coefficient less than 0.35. In an alternate embodiment, the buffer is scalloped. In another alternate embodiment, the buffer comprises a series of hemispheres. In another alternate embodiment, the buffers and the mat are both extruded together from the same material.

DETAILED DESCRIPTION OF A PREFERRED EMBODIMENT

Figure 1:
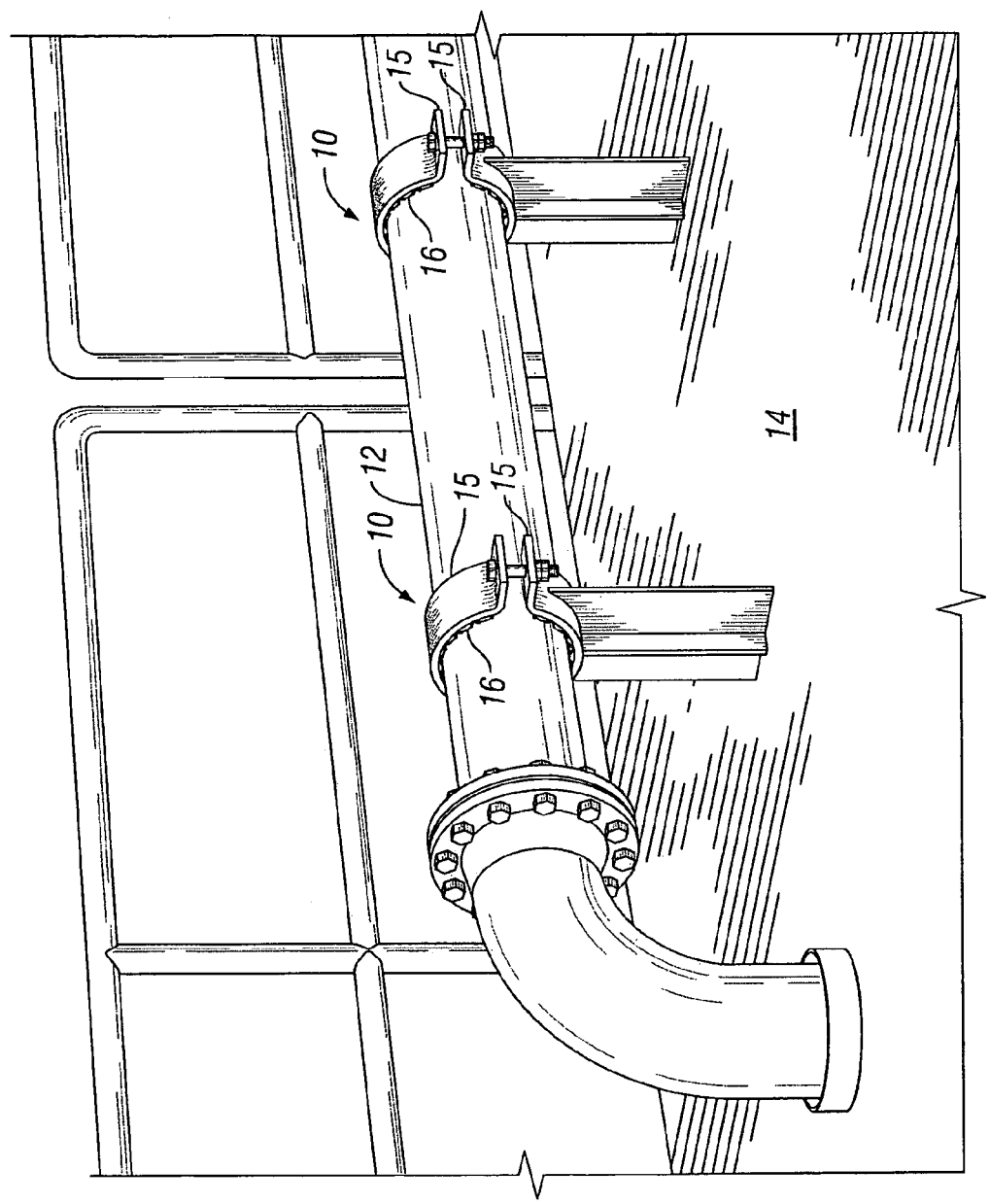
FIG. 1 illustrates pipe supports supporting a pipe, with cylindrical liners in the pipe supports.
Figure 2:
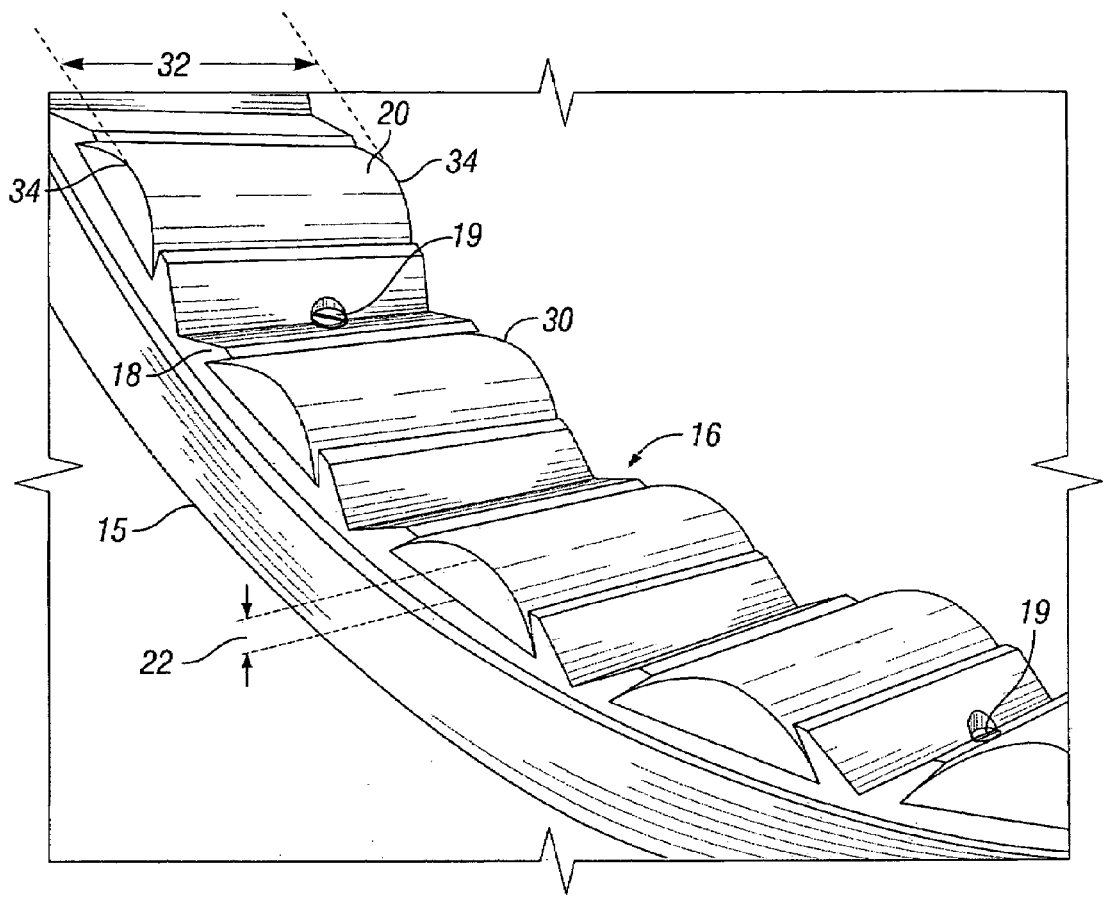
FIG. 2 illustrates a close up view of a cylindrical liner in a pipe support.

In FIG. 1 circular metallic pipe supports 10 support a metallic pipe 12 above a floor 14. The pipe support 10 includes two half-shell-clamps 15, also known as "C" clamps, joined by a nut and bolt at each end. The pipe support 10 also includes a liner 16 according to the present invention. Referring now to FIG. 2, the liner 16 includes a continuous flexible mat 18 that contains a series of segmented cylindrically-curved buffer sections 20. The mat 18 is attached to the pipe support 10 by machine screws 19 through the mat 18 into the pipe support, but could also be attached by non-metallic rivets or anchor bolts. The cylindrically-curved buffer section 20 is made of an acetyl type polymer, but can be made of any non-metallic, non-elastomer material that provides electrical isolation between the pipe support 10 and the pipe 12, that can withstand compressive strength of at least 8,000 psi, is UV stable, and has a friction coefficient less than 0.35. In the preferred embodiment, the acetyl of the cylindrically-curved buffer section 20 is made of "Acetron GP", item number R118-01000-AGP-QUAD, made by Bodecker Plastics, located in Shiner, Texas.

The height 22 of each cylindrically-curved buffer section 20 is chosen so that the total displacement distance 24 (see FIG. 4) of the pipe support from the pipe, which is the height 22 plus the thickness 26 (see FIG. 3) of the mat 18, is equal to or less than three-eighths of an inch. In the preferred embodiment, the height 22 is 0.25 inch. However, in alternate embodiments, the total displacement distance 24 can be up to three-fourths of an inch. The radius of the curvature 30 of the cylindrically-curved buffer section 20 is chosen so that a whole round would have an outside diameter of 1 inch; thus it has a one-half inch radius. The circumferential length of the curvature 30 is thus 1.05 inch. However, in alternate embodiments, the radius can range from 0.75 inch to 0.375 inch. The length 32 between the ends 34 of each cylindrical section 20 is substantially the same, and is chosen so that it is within the range of 1.5 inch to 24 inches.

Figure 3:
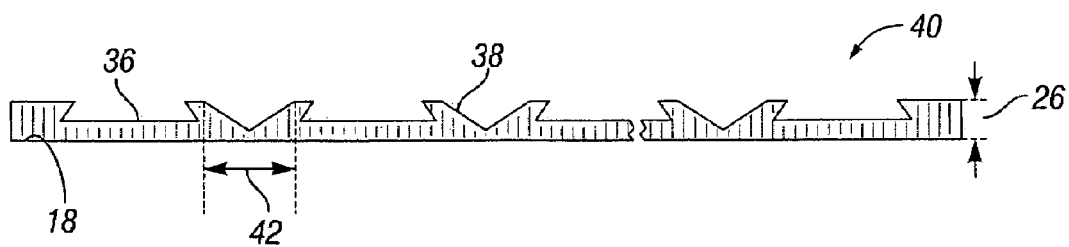
FIG. 3 illustrates a side view of the mat of a cylindrical liner.

Referring now to FIG. 3, the mat 18 has dove-tail slots 36 spaced apart by V-notches 38. In the preferred embodiment, the material of the mat 18 is TIVAR, purchased from Bodecker Plastics, located in Shiner, Tex. The dove-tail slots 36 are formed to snugly receive the sections 20. The tolerance in the fit between the slot 36 and a cylindrically-curved buffer section 20 is preferably 0.005 inch, but can be anywhere within the range of 0.001 to 0.05 inch. This range of tolerance provides a wicking action that aids in wicking moisture away from the contact between the section 20 and the pipe 12.

A cylindrically-curved buffer section 20 is inserted into a cross-sectional end 40 of a dove-tail slot 36 by putting pressure on an end 34 of the cylindrically-curved buffer section 20. However, in an alternate embodiment, the continuous flexible mat 18 and the series of segmented cylindrically-curved buffer sections 20 are not separate pieces, but rather are extruded from one acetyl based material. The width 42 of the V-notch 38 varies according to the outside diameter of the pipe to be supported. The width 42 is preferably equal to the radius of the buffer, but usually the width 42 equals at least one-half inch. This width 42 aids in air flow between the contact points of the cylindrically-curved buffer sections 20 and the pipe 12, thus aiding in drying moisture around the contact points.

Figure 4:
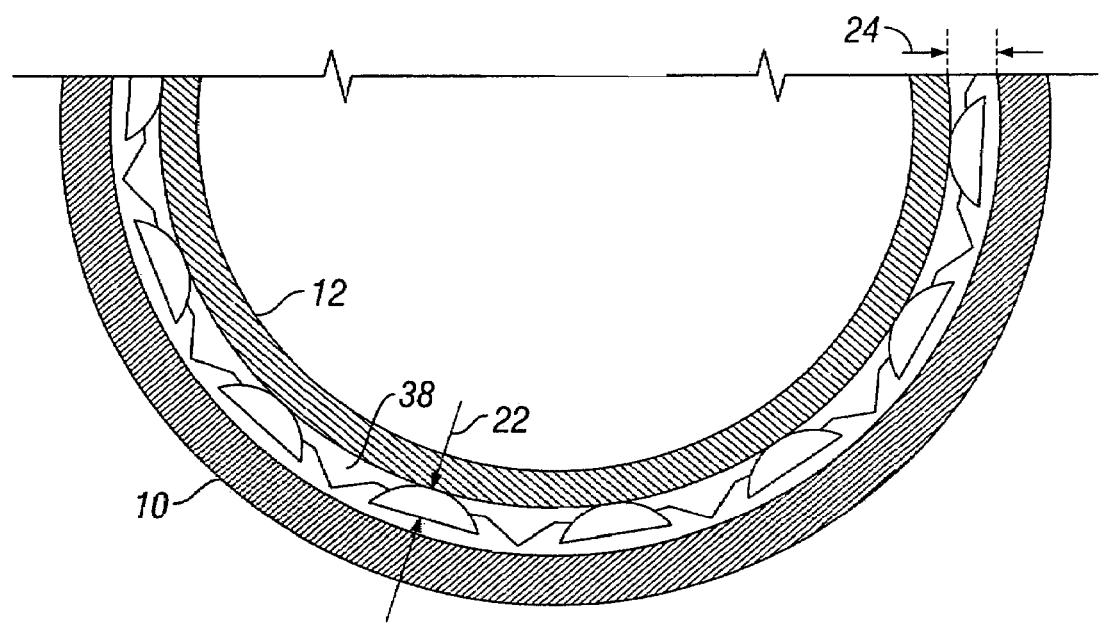
FIG. 4 illustrates a cross sectional end view of a cylindrical liner in a pipe support.

Referring now to FIG. 4, it can be seen that air can flow through the V-notch 38 along the pipe 12 through the width of the pipe support 10.

Figure 5:
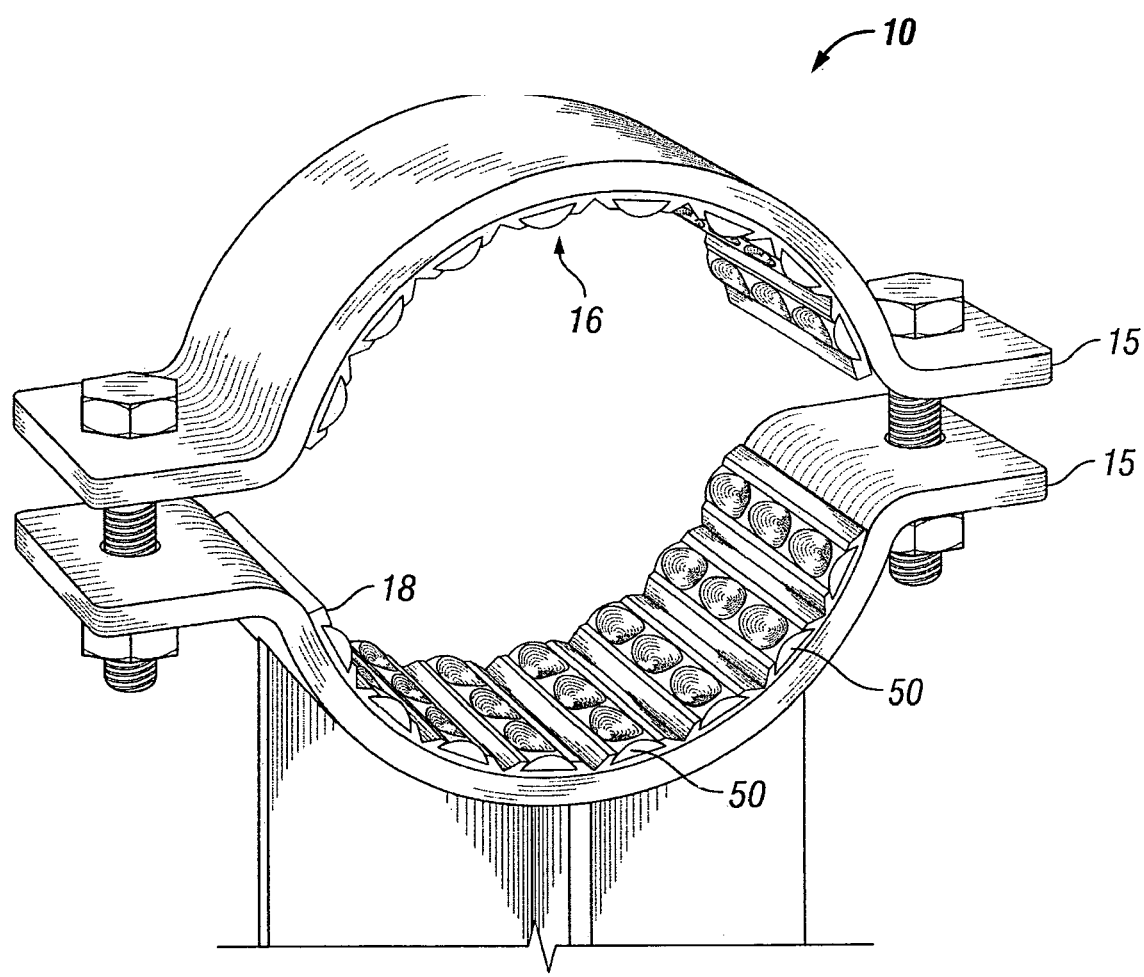
FIG. 5 illustrates scalloped liners in a pipe support.
Figure 6A:
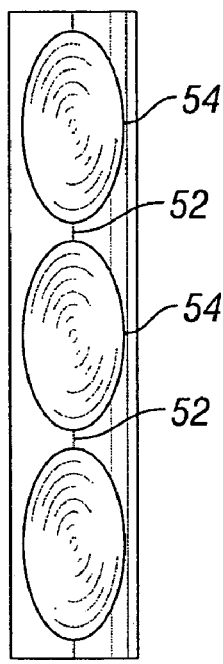
FIGS. 6A, 6B, and 6C illustrate top, side, and perspective views of a scalloped section of a liner.
Figure 6B:
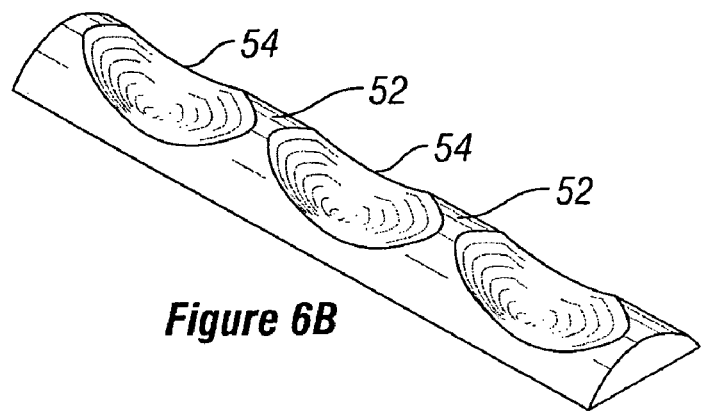
Figure 6C:
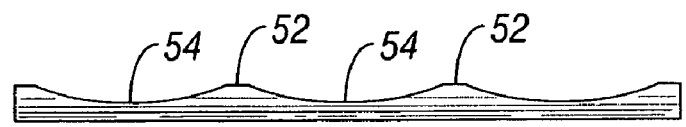
Figure 7:
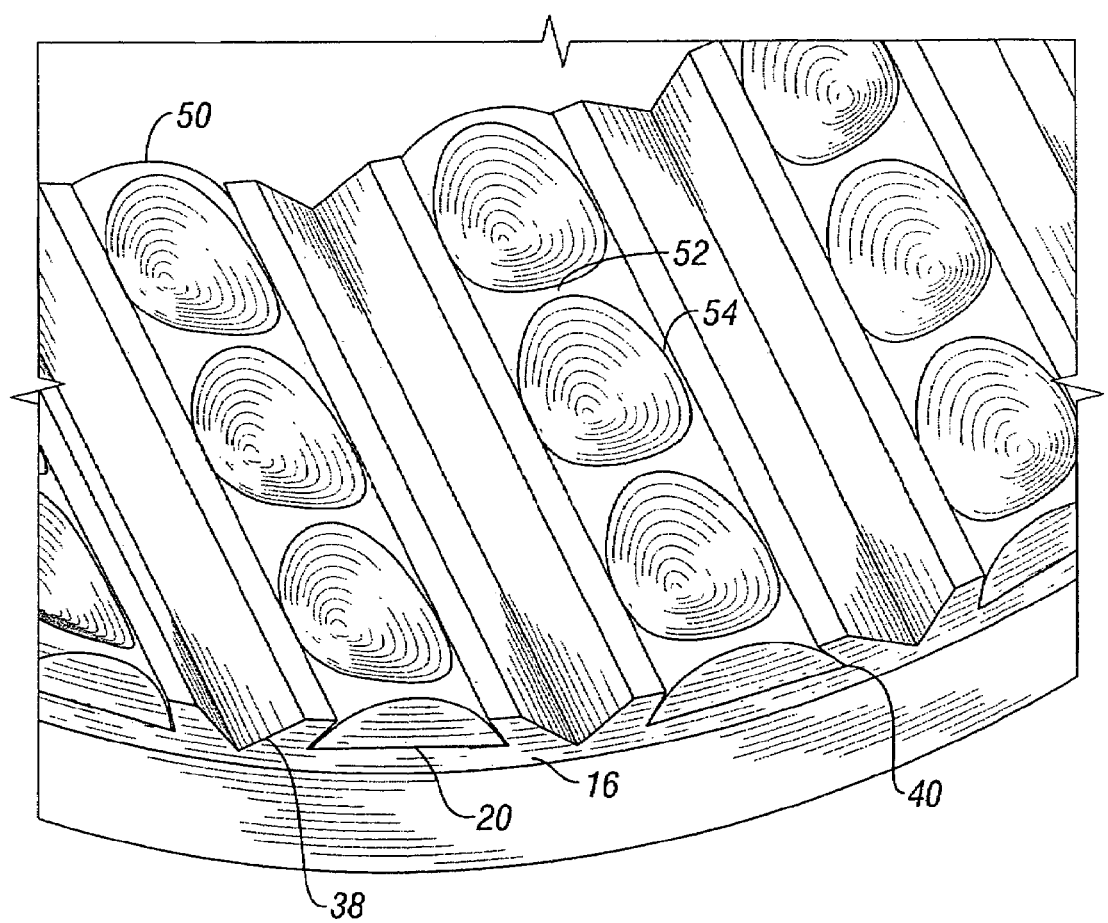
FIG. 7 illustrates a close up view of a scalloped liner in a pipe support.

Referring now to FIG. 5, in an alternate embodiment scalloped sections 50 replace the cylindrically-curved buffer sections 20 in the dove-tail slots 36. The scalloped section 50 further reduces the contact surface area between the liner 16 and the pipe 12, thus further inhibiting moisture retention, and thus further inhibiting corrosion at the point of contact of the metallic pipe support 10 and the pipe 12. Referring now to FIG. 6, points of contact 52 between scalloped areas 54 are about one-eighth inch wide. The height 22, the total displacement distance 24, the thickness 26, and the radius 28 all remain the same. Referring now to FIG. 7, it can be seen that the contact surface area of the scalloped section 50, compared to the cylindrically-curved buffer section 20, between the liner 16 and the pipe 12, is greatly reduced.

In another alternate embodiment, the sections 50, instead of being scalloped, comprise a series of hemispheres, such that the contact surface area is further reduced to a more circular area. As with the cylindrically-curved buffer sections 20, these alternate embodiments of the cylindrically-curved buffer section 20, can be separate pieces that are assembled with the mat 18, or the sections and the mat 18 can all be one piece of extruded acetyl type material.

What is claimed is:

1. A corrosion inhibiting liner for a pipe support, comprising:
    a) a flexible mat containing spaced-apart slots; and
    b) a cylindrically-curved buffer section disposed in each slot, wherein each cylindrically-curved buffer section is made of a non-metallic, non-elastomer material, wherein the slots are separated by V-notches.

2. The liner of claim 1, wherein the slots are dove-tail slots.

3. The liner of claim 2, wherein the greatest thickness of the mat combined with the buffer section is equal to or less than three-fourths of an inch.

4. The liner of claim 3, wherein the length of each buffer section is substantially the same, and the length of each buffer section is from 1.5 inch to 24 inches.

5. The liner of claim 4, wherein the circumferential length of the curvature of each buffer section is substantially the same, and the circumferential length of each buffer section is from 0.8 inch to 2.5 inches.

6. The liner of claim 1, wherein the buffer section is made of an acetyl type polymer.

7. The liner of claim 1, wherein the width of the V-notch is substantially the same as the buffer section radius.

8. The liner of claim 1, wherein the buffer section comprises a scalloped section.

9. The liner of claim 1, wherein the buffer section comprises a series of hemispheres.

10. The liner of claim 1, wherein the a non-metallic, non-elastomer material comprises a material that can withstand compressive strength of at least 8,000 psi, and has a friction coefficient less than 0.35.

11. A corrosion inhibiting liner for a pipe support, comprising:
    a) a flexible mat having a plurality of V-notches formed therein; and
    b) a series of cylindrically-curved buffer sections disposed on the mat between the plurality of V-notches, wherein the cylindrically-curved buffer and the flexible mat are extruded together from the same material and the material comprises a non-metallic, non-elastomer material.

12. The system of claim 11, wherein the slots are dove-tail slots.

13. The system of claim 12, wherein the length of each buffer section is substantially the same, and the length of each buffer section is from 1.5 inch to 24 inches.

14. The liner of claim 11, wherein the a non-metallic, non-elastomer material comprises a material that can withstand compressive strength of at least 8,000 psi, and has a friction coefficient less than 0.35.

15. A system for supporting a pipe, and inhibiting corrosion, comprising:
    a) two half-shell clamps;
    b) a flexible mat containing spaced-apart slots; and
    c) a cylindrically-curved buffer section disposed in each slot, wherein each cylindrically-curved buffer section is made of a non-metallic, non-elastomer material, wherein the slots are separated by V-notches.

16. The system of claim 15, wherein the greatest thickness of the mat combined with the buffer section is equal to or less than three-fourths of an inch.

17. The system of claim 16, wherein the circumferential length of the curvature of each buffer section is substantially the same, and the circumferential length of each buffer section is from 0.8 inch to 2.5 inches.

18. The system of claim 15, wherein the buffer section is made of an acetyl type polymer.

19. The system of claim 15, wherein the width of the V-notch is substantially the same as the buffer section radius.

20. The system of claim 15, wherein the buffer section comprises a scalloped section.

21. The system of claim 15, wherein the buffer section comprises a series of hemispheres.

22. The liner of claim 15, wherein the a non-metallic, non-elastomer material comprises a material that can withstand compressive strength of at least 8,000 psi, and has a friction coefficient less than 0.35.

* * * * *